United States Patent
Fadnis et al.

(10) Patent No.: US 11,640,540 B2
(45) Date of Patent: May 2, 2023

(54) INTERPRETABLE KNOWLEDGE CONTEXTUALIZATION BY RE-WEIGHTING KNOWLEDGE GRAPHS

(71) Applicant: International Business Machines Corporation, Armonk, NY (US)

(72) Inventors: Kshitij Fadnis, Astoria, NY (US); Kartik Talamadupula, Port Chester, NY (US); Pavan Kapanipathi Bangalore, White Plains, NY (US); Achille Belly Fokoue-Nkoutche, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 566 days.

(21) Appl. No.: 16/814,448

(22) Filed: Mar. 10, 2020

(65) Prior Publication Data

US 2021/0287102 A1    Sep. 16, 2021

(51) Int. Cl.
| | | |
|---|---|---|
| G06N 5/02 | (2023.01) | |
| G06N 3/08 | (2023.01) | |
| G06N 3/04 | (2023.01) | |
| G06F 16/28 | (2019.01) | |
| G06N 5/01 | (2023.01) | |

(52) U.S. Cl.
CPC .......... *G06N 5/02* (2013.01); *G06F 16/288* (2019.01); *G06N 3/04* (2013.01); *G06N 3/08* (2013.01); *G06N 5/01* (2023.01)

(58) Field of Classification Search
CPC ...... G06F 40/40; G06F 16/9024; G06F 40/30; G06F 16/288; G06K 9/627; G06K 9/6262; G06K 9/6215; G06K 9/6218; G06N 20/00; G06N 3/08; G06N 5/003; G06N 5/02; G06N 3/04; G06N 5/022
USPC ...... 707/769, 759, 758, 737; 706/47, 52, 60, 706/45, 11, 14, 46, 20
See application file for complete search history.

(56) References Cited

U.S. PATENT DOCUMENTS

| | | |
|---|---|---|
| 9,704,104 B2 | 7/2017 | Nassar et al. |
| 10,198,491 B1 * | 2/2019 | Semturs ............... G06F 16/367 |
| 10,311,050 B2 | 6/2019 | Beller et al. |
| 10,423,652 B2 | 9/2019 | Zhai et al. |
| 10,430,464 B1 | 10/2019 | Ravi et al. |
| 2009/0012923 A1 | 1/2009 | Moses et al. |

(Continued)

OTHER PUBLICATIONS

{Grace Period Disclosure}: Fadnis, K. et al., "Heuristics for Interpretable Knowledge Graph Contextualization", Association for the Advancement of Artificial Intelligence, Novembers, 2019, pp. 1-9, arXiv preprint arXiv:1911.02085, Cornell University, United States, downloaded: https://arxiv.org/abs/1911.02085v1.

(Continued)

*Primary Examiner* — Evan Aspinwall
(74) *Attorney, Agent, or Firm* — Sherman IP LLP; Kenneth L. Sherman; Steven Laut

(57) ABSTRACT

A method for assigning weights to a knowledge graph includes extracting information from a knowledge graph. The information including entities extracted from nodes of the knowledge graph and relations extracted from edges of the knowledge graph. A shortest path generator receives the extracted entities and relations, and potential assigned weights from a heuristic data repository. Weights for the edges of the knowledge graph are determined. The weights are assigned to the edges of the knowledge graph.

20 Claims, 9 Drawing Sheets

(56) References Cited

U.S. PATENT DOCUMENTS

| | | | |
|---|---|---|---|
| 2016/0189028 A1* | 6/2016 | Hu | G06F 3/04842 706/46 |
| 2017/0103337 A1 | 4/2017 | Cao et al. | |
| 2018/0060734 A1 | 3/2018 | Beller et al. | |
| 2019/0005163 A1 | 1/2019 | Farrell et al. | |
| 2019/0163835 A1 | 5/2019 | Scheideler et al. | |
| 2019/0213260 A1 | 7/2019 | Bacarella et al. | |
| 2019/0294732 A1 | 9/2019 | Srinivasan et al. | |
| 2019/0303498 A1 | 10/2019 | Saha et al. | |

OTHER PUBLICATIONS

Mell, P., et al., "The NIST Definition of Cloud Computing", National Institute of Standards and Technology Special Publication 800-145, Sep. 2011, pp. 1-7, U.S. Department of Commerce, United States.

Shiralkar, P. et al.; "Finding Streams In Knowledge Graphs To Support Fact Checking", Cornell University Library, arXiv:1708.07239v1, pp. 1-10, Aug. 24.

Dellin, C.M. et al.; "A Unifying Formalism For Shortest Path Problems with Expensive Edge Evaluations via Lazy Best-First Search over Paths With Edge Selectors", ICAPS'16 26th ACM International Conference On, pp. 459-467, Jun. 12-17, 2016, London.

Sadeghi, A. et al.; "Steiner Tree Methods For Optimal Sub-Network Identification: An Empirical Study", BMC Bioinformatics, pp. 1-19, Apr. 30, 2013, vol. 4, Article 144, BioMed Central, Germany.

Xian, Y. et al.; "Reinforcement Knowledge Graph Reasoning For Explainable Recommendation", 42nd International ACM SIGIR Conference (SIGIR'19), pp. 285-294, Jul. 21-25, 2019, Paris, France.

Yoshida, T. et al.; "Learning Interpretable Metric Between Graphs: Convex Formulation and Computation with Graph Mining", KDD'19 25th ACM SIGKDD International Conference On, pp. 1026-1036, Aug. 4-8, 2019, Alaska, United States.

Chen, Q. et al., "Neural natural language inference models enhanced with external knowledge." arXiv preprint arXiv: 1711.04289, Nov. 12, 2017, pp. 1-12, United States.

Glockner, M. et al., "Breaking NLI Systems with Sentences That Require Simple Lexical Inferences," arXiv preprint arXiv:1805.02266, May 6, 2018, pp. 1-6, United States.

Wang, X., et al. "Improving Natural Language Inference Using External Knowledge in the Science Questions Domain." In Proceedings of the AAAI Conference on Artificial Intelligence, pp. 7208-7215. 2019, vol. 33, AAAI, United States.

Gerevini, A. et al., "LPG: A Planner Based on Local Search for Planning Graphs with Action Costs." In AIPS, pp. 281-290, Apr. 23, 2002, vol. 2, United States.

* cited by examiner

900

```
┌─────────────────────────────────────────────────────────────┐
│ Extracting Information From A Knowledge Graph, The Information│
│ Comprising Entities Extracted From Nodes Of The Knowledge Graph│
│   And Relations Extracted From Edges Of The Knowledge Graph │
│                            910                              │
└─────────────────────────────────────────────────────────────┘
                              │
                              ▼
┌─────────────────────────────────────────────────────────────┐
│ Receiving, By A Shortest Path Generator, The Extracted Entities And│
│  Relations, And Potential Assigned Weights From A Heuristic Data │
│                         Repository                          │
│                            920                              │
└─────────────────────────────────────────────────────────────┘
                              │
                              ▼
┌─────────────────────────────────────────────────────────────┐
│      Determining Weights For The Edges Of The Knowledge Graph│
│                            930                              │
└─────────────────────────────────────────────────────────────┘
                              │
                              ▼
┌─────────────────────────────────────────────────────────────┐
│       Assigning The Weights To The Edges Of The Knowledge Graph│
│                            940                              │
└─────────────────────────────────────────────────────────────┘
```

FIG. 9

INTERPRETABLE KNOWLEDGE CONTEXTUALIZATION BY RE-WEIGHTING KNOWLEDGE GRAPHS The following disclosure is submitted under 35 U.S.C. 102(b)(1)(A):
DISCLOSURE: Heuristics for Interpretable Knowledge Graph Contextualization, Kshitij Fadnis, Kartik Talamadupula, Pavan Kapanipathi, Haque Ishfaq, Salim Roukos, Achille Fokoue, Nov. 5, 2019, Association for the Advancement of Artificial Intelligence, arXiv preprint arXiv: 1911.02085, Cornell University, 2019.

BACKGROUND

The field of embodiments of the present invention relate to weighting knowledge graphs (KGs) for task-specific knowledge.

KGs contain a very large amount of knowledge about the world and phenomena within it. Such knowledge can be very useful in natural language processing (NLP) tasks (e.g., question answering, textual entailment, etc.), which can benefit from a large amount of specialized, domain-specific knowledge. However, recent approaches that have attempted to use KGs as sources of external knowledge for the textual entailment problem have found that bringing in external knowledge from KGs comes with a significant downside—namely noise that is brought in from the external knowledge. This noise mainly occurs due to the fact that KGs are very large graphs that often contain wrong, repeated, and incomplete information. Retrieving a sub-graph of a given KG that is relevant to a given problem instance is a non-trivial task.

One problem is extracting the sub-graph of a given (large) graph that is most relevant to a given context or problem setting; this is referred to as the KG contextualization problem. There are many ways of extracting such a sub-graph, and they must all be tied in some way to the overall metric: that is, the performance on the problem setting in question. The textual entailment problem has conventionally been cast as a classification problem, where a given textual entailment instance consists of a premise P and a hypothesis H. The label indicates the relationship between H and P. The problem with bringing in external knowledge from a KG is one of scale: for any given entity (node) in the KG, within a few hops (between nodes), a large number of nodes are retrieved. Many of these nodes are completely irrelevant to the task at hand, and are not influenced in any way by the context of the problem being solved.

SUMMARY

Embodiments relate to weighting knowledge graphs (KGs) for task-specific knowledge. One embodiment provides a method for assigning weights to a KG includes extracting information from a KG. The information including entities extracted from nodes of the KG and relations extracted from edges of the KG. A shortest path generator receives the extracted entities and relations, and potential assigned weights from a heuristic data repository. Weights are determined for the edges of the KG. The weights are assigned to the edges of the KG. Other embodiments include a computer program product for assigning weights to a KG, and an apparatus including a memory for storing instructions and a processor configured to execute the instructions. These features contribute to the advantage of using the same knowledge in the form of a KG, and producing different contexts depending on the task at hand to suppress noisy data and boost signal, and using heuristics from search and artificial intelligence (AI) models. The features further contribute to the advantage where inclusion of information from an NLP problem instance is used to determine candidates for shortest path selection. Additional advantages may include that the output of shortest paths is fed into different types of graphical and non-graphical encoders to create a classifier (e.g., for classifying relations (edges)).

One or more of the following features may be included. In some embodiments, the heuristic data repository includes one or more heuristics selected from the group consisting of default cost heuristics, relevant relations heuristics, relation frequency heuristics, and normalized relation frequency heuristics.

In some embodiments, the KG comprises a natural language based KG. For each labeled premise and hypothesis pair, entities are extracted from each respective sentence used for the KG. The method may further create ordered entity pairs or ordered premise-hypothesis entity pairs.

In some embodiments, copies of the KG are created and default weights for the edges are replaced with customized weights based on the relevant relations heuristic, the relation frequency heuristic, and the normalized relation frequency heuristic.

In some embodiments, the relation frequency heuristic is based on a frequency of the relations as they occur in relation to an entity, and based on a normalized count of a number of outgoing edges bearing a same relation name from a given node.

In some embodiments, the normalized relation frequency heuristic is based on a computation of an Inverse Node Frequency (INF) for every relation in the KG.

In some embodiments, the shortest path generator finds all shortest paths between a first entity and a second entity of each premise-hypothesis entity pair, for every copy of the KG.

In some embodiments, the shortest paths are used: by accounting for a number of times relations appear in the shortest paths, and by a sequence order in which the shortest paths appear. Each of the shortest paths are represented by the entities along the respective shortest path, the relations along the respective shortest path, or by a combination thereof.

In some embodiments, the method may further include classifying the relations using one or more encoders selected from a group consisting of a graph convolution network (GCN) encoder, a relation frequency encoder and, a relation sequence encoder.

These and other features, aspects and advantages of the present embodiments will become understood with reference to the following description, appended claims and accompanying figures.

BRIEF DESCRIPTION OF THE DRAWINGS

FIG. 9 illustrates a block diagram of a process for interpretable knowledge contextualization by re-weighting KGs, according to one embodiment.

DETAILED DESCRIPTION

Figure 1:
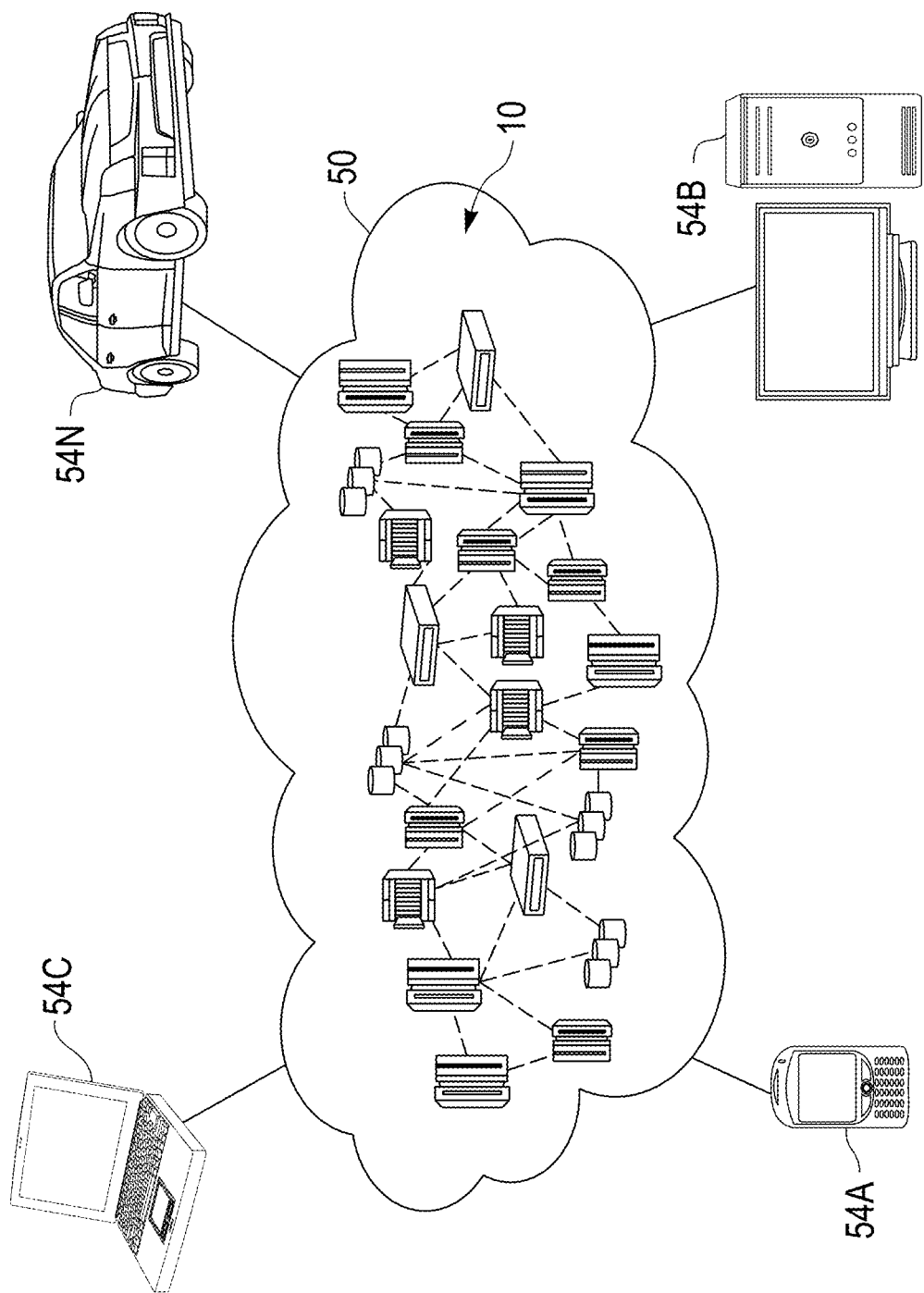
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments relate to interpretable knowledge contextualization by re-weighting knowledge graphs (KGs). One embodiment provides a method for assigning weights to a KG that includes extracting information from a KG. The information including entities extracted from nodes of the KG and relations extracted from edges of the KG. A shortest path generator receives the extracted entities and relations, and potential assigned weights from a heuristic data repository (e.g., a storage system, a memory system, a storage device, a database, etc.). Weights are determined for the edges of the KG. The weights are assigned to the edges of the KG. The method may further include that the heuristic data repository includes one or more heuristics selected from the group consisting of default cost heuristics, relevant relations heuristics, relation frequency heuristics, and normalized relation frequency heuristics. The method may also include that the KG comprises a natural language based KG. The method may also include that for each labeled premise and hypothesis pair, entities are extracted from each respective sentence used for the KG. The method may additionally include that ordered entity pairs or ordered premise-hypothesis entity pairs are created. The method may also include that copies of the KG are created and default weights for the edges are replaced with customized weights based on the relevant relations heuristic, the relation frequency heuristic, and the normalized relation frequency heuristic. The method may further include that the relation frequency heuristic is based on a frequency of the relations as they occur in relation to an entity, and based on a normalized count of a number of outgoing edges bearing a same relation name from a given node. The method may also include that the normalized relation frequency heuristic is based on a computation of an Inverse Node Frequency (INF) for every relation in the KG. The method may additionally include that the shortest path generator finds all shortest paths between a first entity and a second entity of each premise-hypothesis entity pair, for every copy of the KG. The method may further include that the shortest paths are used: by accounting for a number of times relations appear in the shortest paths, and by a sequence order in which the shortest paths appear. Each of the shortest paths are represented by the entities along the respective shortest path, the relations along the respective shortest path, or by a combination thereof. The method may additionally include classifying the relations using one or more encoders selected from a group consisting of a graph convolution network (GCN) encoder, a relation frequency encoder, and a relation sequence encoder. The illustrative embodiments used to describe the invention generally address and solve the above-described problems and other problems related to KG contextualization.

It is understood in advance that although this disclosure includes a detailed description of cloud computing, implementation of the teachings recited herein are not limited to a cloud computing environment. Rather, embodiments of the present embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
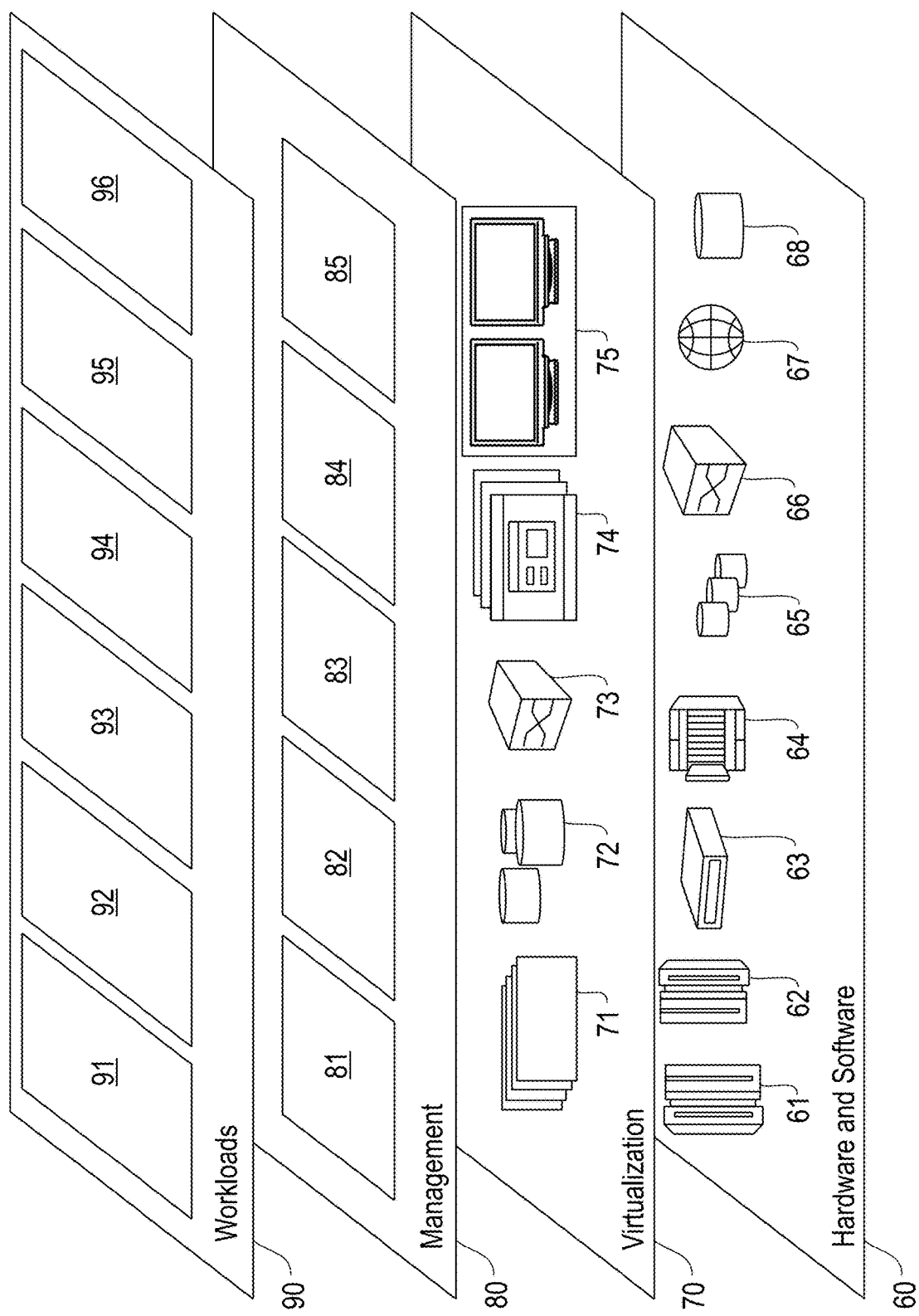
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and interpretable knowledge contextualization by re-weighting KGs processing 96 (see, e.g., system 500, FIG. 5, process 900, FIG. 9). As mentioned above, all of the foregoing examples described with respect to FIG. 2 are illustrative only, and the embodiments are not limited to these examples.

It is reiterated that although this disclosure includes a detailed description on cloud computing, implementation of the teachings recited herein are not limited to a cloud computing environment. Rather, the embodiments may be implemented with any type of clustered computing environment now known or later developed.

Figure 3:
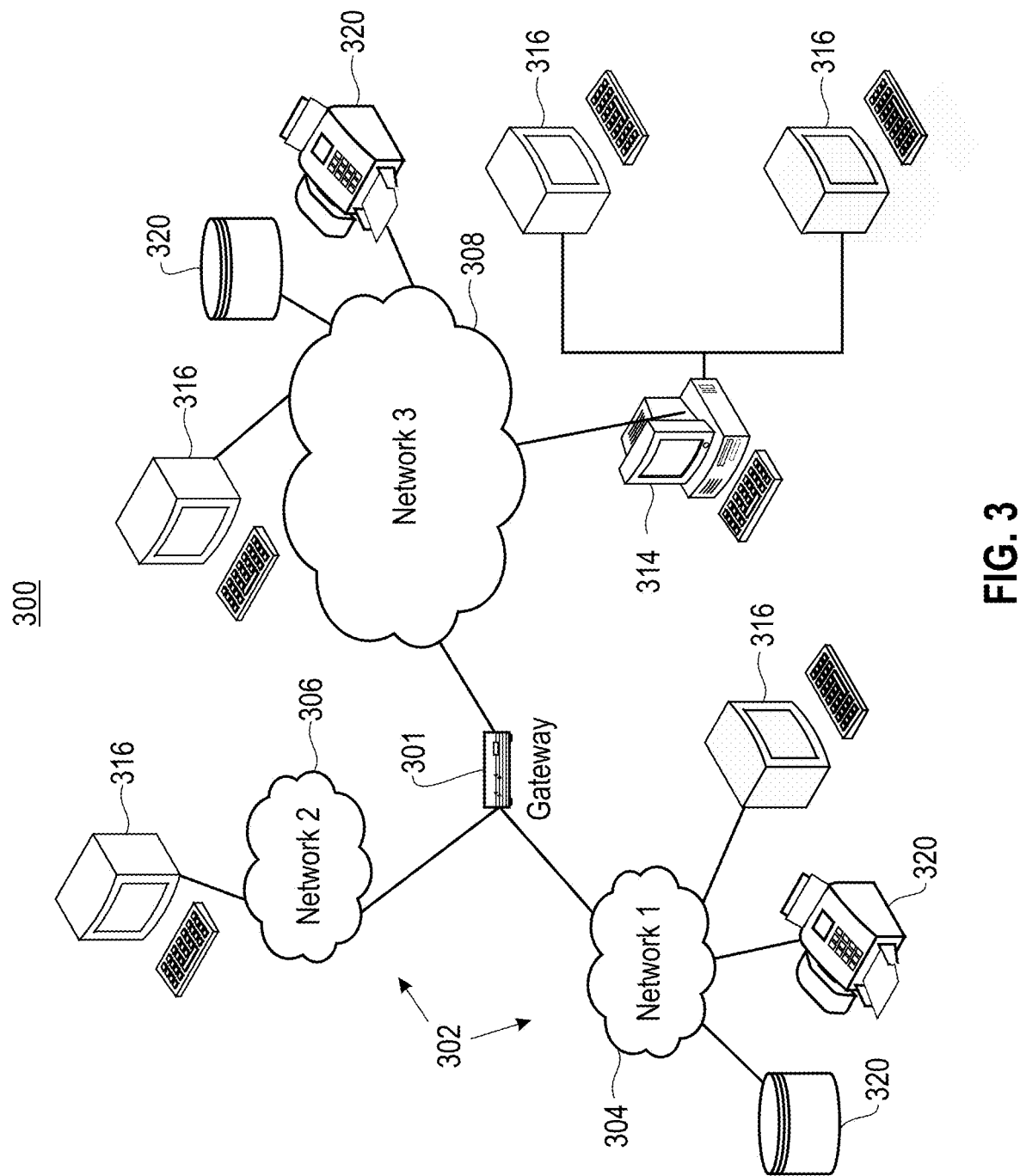
FIG. 3 is a network architecture of a system for interpretable knowledge contextualization by re-weighting Knowledge Graphs (KGs) processing, according to an embodiment.

FIG. 3 is a network architecture of a system 300 for generation and management of AI model documentation processing, according to an embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 316 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX® system that emulates an IBM® z/OS environment, a UNIX® system that virtually hosts a MICROSOFT® WINDOWS® environment, a MICROSOFT® WINDOWS® system that emulates an IBM® z/OS environment, etc. This virtualization and/or emulation may be implemented through the use of VMWARE® software in some embodiments.

Figure 4:
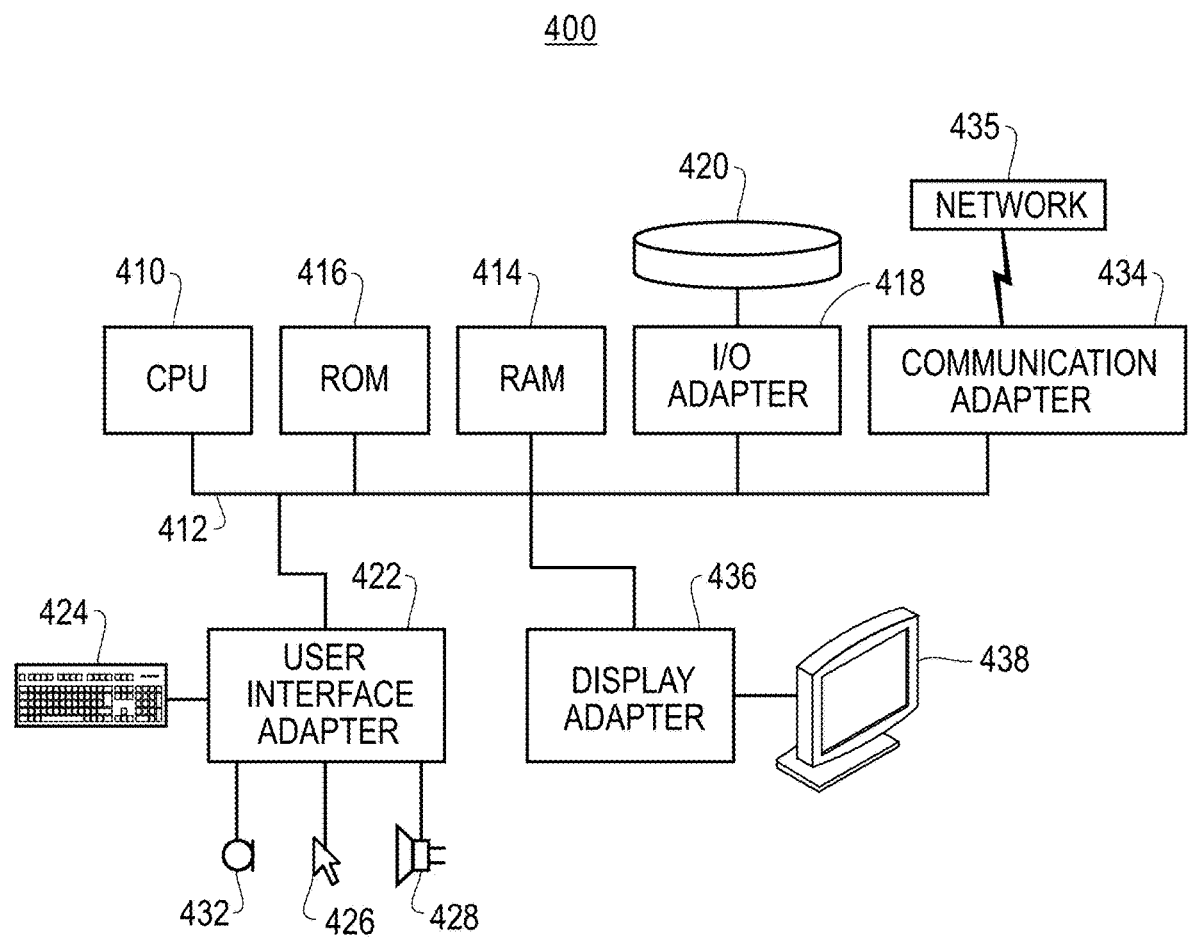
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT® WINDOWS® Operating System (OS), a MAC OS®, a UNIX® OS, etc. In one embodiment, the system 400 employs a POSIX® based file system. It will be appreciated that other examples may also be implemented on platforms and operating systems other than those mentioned. Such other examples may include operating systems written using JAVA®, XML, C, and/or C++ language, or other programming languages, along with an object oriented programming methodology. Object oriented programming (OOP), which has become increasingly used to develop complex applications, may also be used.

Figure 5:
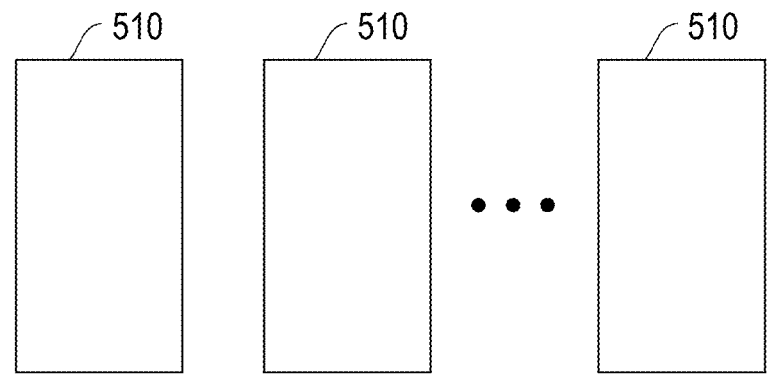
FIG. 5 is a block diagram illustrating a distributed system for interpretable knowledge contextualization by re-weighting KGs, according to one embodiment.
Figure 5:
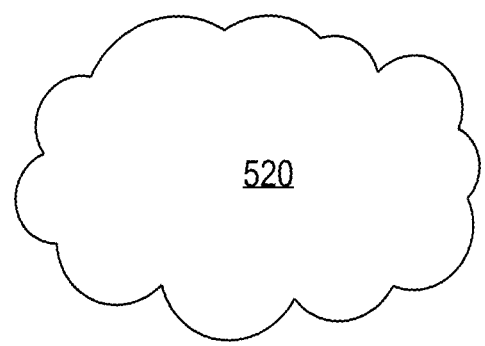
Figure 5:
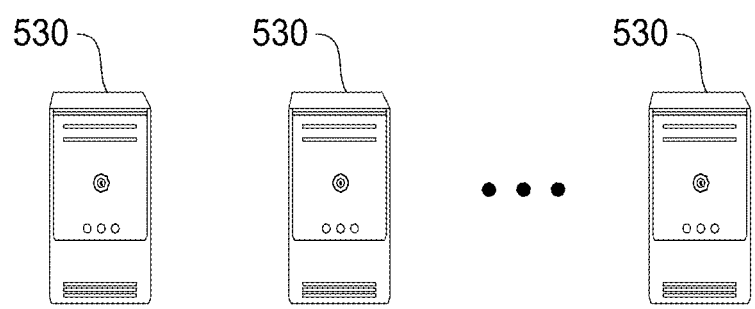

FIG. 5 is a block diagram illustrating a distributed system 500 for interpretable knowledge contextualization by re-weighting KGs, according to one embodiment. In one embodiment, the system 500 includes client devices 510 (e.g., mobile devices, smart devices, computing systems, etc.), a cloud or resource sharing environment 520 (e.g., a public cloud computing environment, a private cloud computing environment, a data center, etc.), and servers 530. In one embodiment, the client devices 510 are provided with cloud services from the servers 530 through the cloud or resource sharing environment 520.

Figure 6:
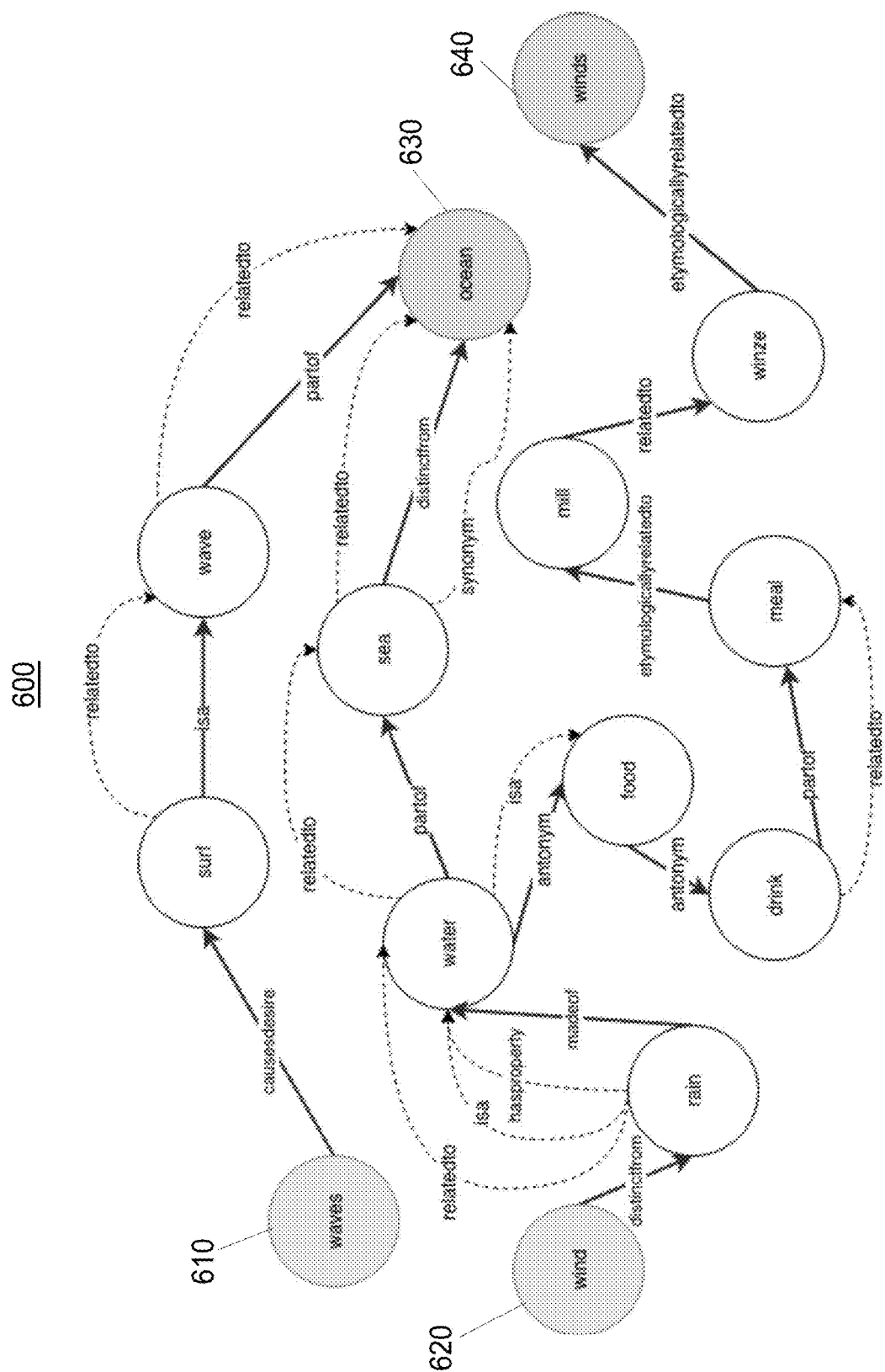
FIG. 6 illustrates an example natural language inference (NLI) instance situated in a KG, according to an embodiment.

FIG. 6 illustrates an example natural language inference (NLI) instance situated in a KG 600, according to an embodiment. KG 600 is an example of an NLI problem instance, along with a sub-KG for that instance. The key problem that needs to be solved is one of ranking and filtering the nodes that are retrieved according to some context-sensitive measure. In the example KG 600, the P nodes are nodes 610 (waves) and 620 (wind), and the H nodes are nodes 630 (ocean) and 640 (winds). One goal is to use the entities (e.g., person, places, organizations, things, events, parts of speech, etc.) in the premise P and hypothesis H— as well as the paths that connect them in an external KG— to do this filtering. In one embodiment: first, the Cartesian product of all pairs of entities C=P×H are computed by a processing system (e.g., a computing device from computing node 10, FIG. 1, hardware and software layer 60, FIG. 2, processing system 300, FIG. 3, system 400, FIG. 4, system 500, FIG. 5, system 700, FIG. 7, GRN architecture 800, FIG. 8, etc.), according to an embodiment; then, for each pair in C, the shortest path between the premise entity and the hypothesis entity is computed. The computation of the shortest path is performed over a copy of the ConceptNet graph, however, various cost functions are employed to predict the closeness of entities (nodes) in the ConceptNet graph. ConceptNet is a KG that connects words and phrases of natural language with labeled edges. The knowledge for a ConceptNet is collected from many sources that include expert-created resources, crowd-sourcing, and games with a purpose. ConceptNet is designed to represent the general knowledge involved in understanding language, improving natural language applications by allowing the application to better understand the meanings behind the words people use. In one embodiment, each heuristic gives rise to a different, cost-customized copy of the graph, in the following manner: the structure of the graph is kept unchanged, but a weight is added to each edge that is computed using a specific cost function. In this way, the traditional notion of the heuristic as used in an A* search (a graph traversal and path search algorithm) is inverted. Instead of assigning cost to each node in the graph, cost is transferred on to each out-going edge of the node. Various cost functions that change the nature of the shortest path between two given entities in a KG are evaluated, and the knowledge that is thus retrieved for any given pair ⟨P, H⟩ is tested via performance on the textual entailment problem.

Early work on the NLI problem was limited by the availability of small data (data small enough for human comprehension in a volume and also for formatting) only, and mostly relied on hand-crafted features. To address this problem, one method used a large-scale Stanford Natural Language Inference (SNLI) corpus/dataset for NLI, and used a Long short-term memory (LSTM) based neural network model (e.g., an artificial recurrent neural network (RNN) architecture in the field of deep learning that uses feedback connections), which was also the first generic neural model without any hand-crafted features. This conventional method used an LSTM model to encode the premise and hypothesis sentences, whose concatenation is then fed to a perceptron classifier. In addition to LSTM-based models, several other neural network models are used for sentence encoding such as gate recurrent unit (GRU) based RNN, tree-based convolutional neural network (CNN), self-attention network (e.g., a neural network that utilizes the attention mechanism as the basic building block; self-attention networks have been shown to be effective for sequence modeling tasks, while having no recurrence or convolutions)), and BiLSTM (bi-directional LSTM). "Matching aggregation" approaches, on the other hand, exploit various matching methods to obtain an interactive premise and hypothesis space. For example, one example performs a word-by-word matching of the hypothesis with the premise using match-LSTM (mLSTM). Another example uses a weighted attention mechanism to get an embedding of the hypothesis conditioned on the premise. Yet another example decomposes the entailment problem into sub-problems through an intra-sentence attention mechanism, and is able to parallelize the training process. Still another example encodes both the premise and the hypothesis conditioned on each other, using BiLSTM and then a soft-attention mechanism over those encodings.

Although there have been extensive studies on the NLI task, the potential for exploiting external knowledge encoded in KGs has not been explored in enough detail. Among the few existing approaches, one uses WordNet (i.e., a lexical database for the English language that groups English words into sets of synonyms (synsets), provides short definitions and usage examples, and records a number of relations among the synsets or their members) as the external knowledge source for NLI. In the conventional approach, features are generated based on WordNet using the relationships in it. However, WordNet, being a lexical database, possesses very few linguistic relationships among entities, and thus its richness as an external knowledge source is limited. There are other KGs such as DBpedia, YAGO, Free-base, etc. that have become popular due to their expressiveness and the richer information contained in them. One issue with expressive KGs is that they are quite massive in terms of the nodes and edges contained in them, which makes it hard to extract relevant information useful for the entailment task.

In one embodiment, the understanding that KGs are essentially directed graphs with labeled edges—the labels denote the relations between the two nodes connected by the edge, while the nodes themselves denote entities is exploited. One of the keys to correctly classifying instances of the textual entailment task is the relationships between the various entities involved. Identifying these relationships using only the text content of the entailment task is an approximate reconstruction of the underlying relationships. While embedding-based methods situate the sentences in some implicit knowledge-enhanced context, one embodiment seeks to situate them in a much more explicit graphical context.

In one embodiment, different versions of the ConceptNet KG that feature customized costs as the weights on the relation-edges; referred to herein as customized cost graphs are implemented. Following this, for each labeled premise and hypothesis pair in the dev partition of the SciTail dataset, the entities are extracted from each respective sentence. The Cartesian product of the premise and hypothesis entities (respectively) may be used to create ordered premise-hypothesis entity pairs. In one embodiment, no additional ordering of the premise-hypothesis entity pairs is required. In one embodiment, the shortest path between each of these entity pairs in the customized cost graphs are then determined. For each premise-hypothesis sentence pair (i.e., a textual entailment problem instance), the collection of shortest paths thus found is then associated with the corresponding label for purposes of learning how to predict the entailment accurately. The details of the processing are described below.

Figure 7:
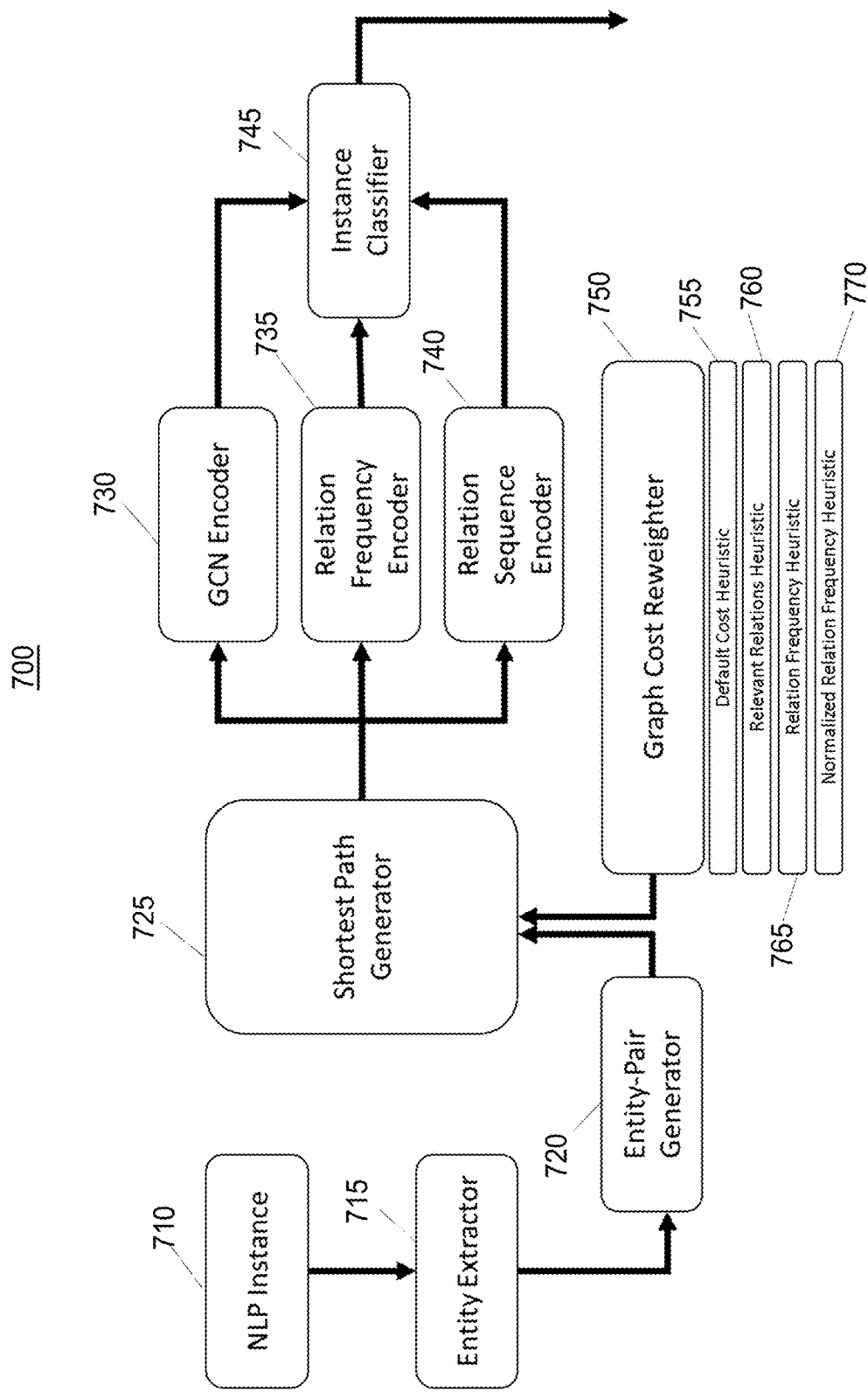
FIG. 7 illustrates a block diagram of a system for interpretable knowledge contextualization by re-weighting KGs, according to one embodiment.

FIG. 7 illustrates a block diagram of a system 700 for interpretable knowledge contextualization by re-weighting KGs, according to one embodiment. In one embodiment, in order to construct explicit graphical context is to select the external knowledge repository. In one example, the natural language processing (NLP) instance 710 processing selects a KG (e.g., a ConceptNet KG, etc.) that contains crowd-sourced and expert-created knowledge in the form of entities (which are represented by nodes in the KG) and relations (which are represented by edges in the KG). Typically, the relations (edges) in the selected KG carry labels that denote the semantic meaning of that edge. In one embodiment, these edges are accompanied by a weight. In one embodiment, the weights along the edges are re-defined to take into account the structure of the KG. More specifically, copies of the selected KG are created and the default weights are replaced with customized weights on the relation-edges by the graph cost reweighter 750 processing. In one embodiment, once the KG is selected by the NLP instance 710 processing, an entity extractor 715 processes the KG and extracts or filters the entity information from the entity nodes (e.g., via parsing, dependency parsing, etc.) and relations information from the edges (e.g., via parsing, dependency parsing, etc.).

It is noted that not all relations between entities are equal. That is, the selected KG— which is made up of entities and the relation edges that connect them—needs to be re-weighted in order to reflect this fact. This re-weighting by the graph cost reweighter 750 processing occurs by rewriting the weights on the edges of the KG, and treating those weights as a cost that is incurred any time that a specific edge has to be traversed. In one embodiment, four different heuristics (default cost heuristic 755 processing, relevant relations heuristic 760 processing, relation frequency heuristic 765 processing and normalized relation frequency heuristic 770 processing) are used to generate these edge-costs: each of the copies of the KG that are generated are referred to as a cost graph.

In one embodiment, the default cost heuristic 755 processing is considered the simplest case that is considered where every single edge in a target KG (e.g., a ConceptNet, etc.) is assigned or associated with a cost of 1:0. This essentially turns the path-finding problem between two given nodes on the KG into a problem of minimizing the number of hops or traversals between nodes: the shortest number of hops provides the most efficient path.

In one embodiment, the relevant relations heuristic 760 processing considers the case where some relations are different from others: that is, some relations are more important to the task at hand than others. In one embodiment, the relevant relations heuristic 760 processing considers relations that are relevant to the textual entailment task. This is a manually filtered subset of the total list of relations present in the selected KG (e.g., ConceptNet, etc.). Some examples of relations that are included in this subset are RELATEDTO, ISA, SIMILARTO, DERIVEDFROM, etc. In one embodiment, for each of these relations, the edge costs of any instance of that relation in the KG is reduced, thus reducing the cost of taking such an edge, and encouraging a shortest-path search processing (e.g., via the shortest path generator 725 processing) to consider these edges first.

In one embodiment, the two prior heuristics feature values are manually decided and set: that is, it is manually determined what the weight on an edge should be. The next step up in complexity is to automate the computation of that weight, and base that computation on some feature of the KG itself. In one embodiment, the first such heuristic is to simply count the frequency of the relations as they occur in relation to an entity. In one embodiment, the relation frequency heuristic 765 processing implements this counting of frequency heuristic as the normalized count of the number of outgoing edges bearing the same relation name from a given node. That is, given a node n that represents an entity in the graph, and rel(n) being the set of outgoing edges from n, the cost $c_i$ for an edge $e_i \in rel(n)$ is represented as $$c_i = \frac{|e_i|}{|rel(n)|}.$$

For example, consider a node $n_1$ that has three outgoing edges: $\{e_1, e_2, e_1\}$. Using the above equation, the weights of the $e_1$ edges would be set to $ce_1=0.67$, while the edge $e_2$ would have a cost of 0:33. This ensures that the edge that is "rarer" is given a lower cost, and is favored by a shortest-path algorithm (e.g., via the shortest path generator 725 processing) in case there is more than one way to travel from node $n_1$ to a neighboring node.

In one embodiment, the normalized (or global) relation frequency heuristic 770 processing builds on top of the relation frequency metric (from the relation frequency heuristic 765 processing) by addressing a significant issue: the presence of common relations that occur throughout the KG, but may occur relatively fewer times at any one individual node. An example of such a relation is ISA; while this relation is likely to occur relatively fewer times at any given node, it is clear that it occurs throughout the KG. In one embodiment, to ensure that a truly rare relation that participates in an entailment instance, it is given more importance (and subsequently less cost) than one which occurs throughout the KG. To do this, first the normalized relation frequency heuristic 770 processing computes the INF (the analog of inverse document frequency (IDF)) for every relation in the KG. Given a KG with node-set N, let the quantity $n_{rel_i}$ be the number of times relation $rel_i$ appears in the nodes in N as an outgoing edge. The INF for edges with the relation label $rel_i$ can then be calculated as $$INF_{rel_i} = \log \frac{|N|}{n_{rel_i}}.$$

Next, the normalized relation frequency heuristic 770 processing computes the normalized Relation Frequency (RF) similarly as described above. Thus, given a node n E N with a set of outgoing edges e, the RF for an edge with relation i can be calculated as $$RF_{rel_i} = \frac{|e_i|}{|e|}.$$

Since the interest is in promoting "rarer" relations by associating lower cost with them, INF is inverted during the calculation of the final cost metric, giving the cost as $$c_i = RF_{i\_} \times \frac{1}{INF_i}.$$

In one embodiment, once the various cost graphs are generated as described above, it is then time to use those respective graphs to obtain the relationships between, for example, two sentences in a given textual entailment instance. Assume that this instance is denoted $\tau=\langle p, h \rangle$, where p is the premise sentence and h is the hypothesis sentence. In one embodiment, the first taken is to represent each sentence using its respective entities: that is, the representation of a sentence is collapsed into an ordered set of those entities from the sentence that also appears in the KG (e.g., ConceptNet). These ordered sets are denoted as P and H respectively. Since it is not known which entities in the premise and which ones in the hypothesis contribute directly to the classification of the entailment relationship, the Cartesian product of the two ordered sets P and H are taken to generate the set of all possible ordered pairs between p and h via the entity-pair generator 720 processing. This set $S=P\times H=\{(a, b)|a\in P, b\in H\}$ is then used as the input for the shortest path generation processing via the shortest path generator 725 processing.

Once we have the sets of premise-hypothesis entity pairs from the entity-pair generator 720 processing, the processing of system 700 proceeds to the shortest path generator 725 processing that finds all shortest paths between the first and second entity of each pair, for every cost graph outlined previously. In one example embodiment, a shortest-path algorithm is employed (e.g., NetworkX's implementation of the Dijkstra path function that returns the shortest path from source to target in a weighted graph). Since the ConceptNet KG has about 1 million nodes and well over 3 million edges, finding shortest paths is an extremely expensive process (in terms of computations). Additionally, after an analysis of entity pairs from the example ConceptNet KG that features more than one direct edge between them (multi-edges), it is determined that the most common relationship (RELATEDTO) occurs about 83% of the time. The second most common relationship (FORMOF) occurs in about 33% of cases. Further, these two relations co-occur around 30% of the time, and of those cases, for about 97% of the time, they are the only two relations connecting that entity pair. All of these support a hypothesis that selecting at random between paths that contains either of these relationships will not have a significant impact on the NLI classification problem. Therefore, in one embodiment the problem of finding all shortest paths between premise-hypothesis entity pairs is reduced to one of finding a single shortest path.

In one embodiment, once the pairwise shortest paths are generated by the shortest path generator 725 processing, the system 700 uses them in a way that enables the system 700 to train on labeled textual entailment instances, in order to make predictions on new instances. For this the system 700 focuses particularly on the path part of the shortest paths; that is, at interest is the consideration of the relations used to connect a given premise and hypothesis pair from a textual entailment instance. This harks back that the relationships between entities in the textual entailment instance are key to identifying the overall entailment relationship. In one embodiment, two specific ways in which the shortest paths are used include: by accounting for the number of times relations appear in those paths (determined by the relation frequency encoder 735 classification processing); and then the sequence order in which they appear (by the relation sequence encoder 740 classification processing). These two approaches differ from conventional techniques that only consider entity-level information and completely ignore relationships.

Most conventional models for the NLI problem use only the premise and hypothesis sentence as input. In one example embodiment, an mLSTM is used as a text-based model. In one embodiment, an implementation of mLSTM that is employed by the GCN encoder 730 processing encodes both premise and hypothesis as Bi-GRUs (as against Bi-LSTMs), and a fixed representation of the hypothesis that is premise-attended is output. Such asymmetry in the modeling of the premise-hypothesis relationship has led to an improved performance of mLSTM on various leaderboards.

In order to enhance the text models that have been used by conventional systems, one embodiment incorporates external knowledge in the form of the frequency distribution of relations present along the shortest paths between premise-hypothesis entity pairs via the relation frequency encoder 735 processing. The size of the vector representing the paths is the same as the number of distinct relationships in the KG. The exemplar ConceptNet KG has 47 distinct relationships. Hence, in one embodiment each relationship is assigned a fixed positional index in this vector.

In one embodiment, the frequencies of relations present in the paths are computed by the relation frequency encoder 735 processing across all premise-hypothesis entity pairs in a single NLI instance. For example, consider that there are two premise-hypothesis entity pairs with shortest paths RELATEDTO→ISA→RELATEDTO; and RELATEDTO→SYNONYM→FORMOF respectively. The frequency counts would then be RELATEDTO: 3, ISA: 1, SYNONYM: 1, FORMOF: 1; and 0 everywhere else. The non-zero frequency values are set at their respective relation position index. The relation frequency encoder 735 processing thus forms the relation frequency vector and concatenates it with the final hidden state from the text model. The combination is then forwarded to a fully connected feed forward network (instance classifier 745). In one embodiment, the relation frequency vector is scaled to higher dimensions via linear layers. The use of this frequency based model (the relation frequency encoder 735) makes it possible to analyze the learned weights, and subsequently intuit the importance and contribution of each relation in the classification task accuracy.

After modeling the shortest paths as the frequency counts of the relations along those paths by the relation frequency encoder 735, the next phase of system 700 processing is to use the sequentiality inherent in a shortest path by the relation sequence encoder 740 processing. Recent work on Graph Convolutional Recurrent Networks (GCRN) has explored representing sequential graphical structures as fixed representations. One of the major differences between the conventional approach and one embodiment is the degree or level of sequentiality. In the current problem, there are two levels of sequential information that are faced. One of these is at the level of ordered premise-hypothesis entity pairs. The other is at the level of the path, which is represented as a sequence of relations, entities, or both; per premise-hypothesis entity pair.

In one embodiment, the shortest path generator 725 processing capture the bi-level sequentiality inherent in the shortest paths. Assume each textual-entailment instance τ consists of premise (p) and hypothesis (h), which together constitute a sentence pair. After processing each τ as described above, the shortest path generator 725 processing obtains an ordered set of shortest paths. Each of these shortest paths can be represented by either the entities along that path (alone), the relations along that path (alone), or a combination of both the entities and relations. Various hierarchical architectures that have been proposed for different learning-centric tasks may be employed. The hierarchical assumption formulates a sequence at two levels: (1) a sequence of tokens for each pair; and (2) a sequence of pairs. In one embodiment, the instance classifier 745 models this hierarchy as two recurrent neural networks.

Figure 8:
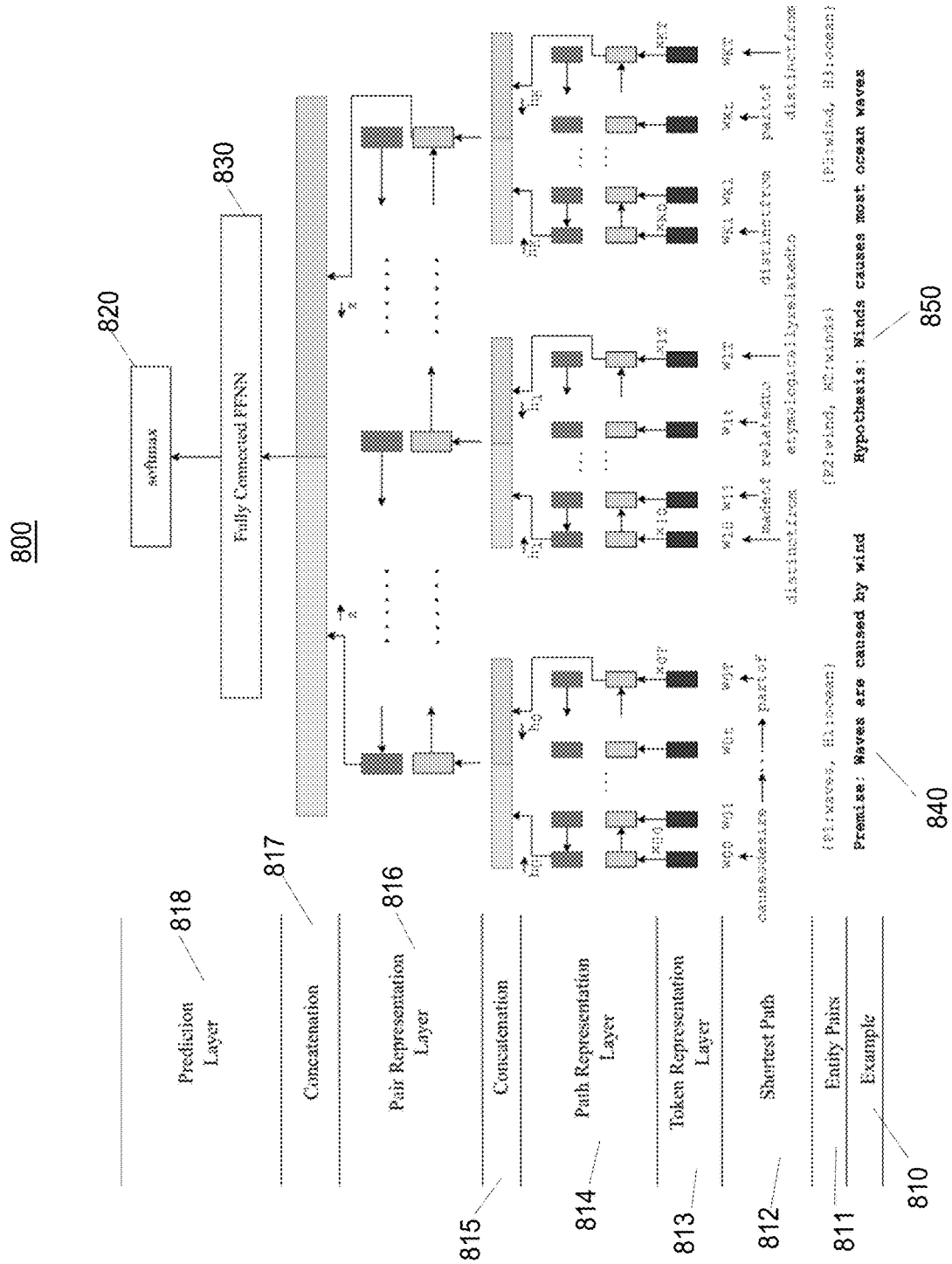
FIG. 8 illustrates a graph recurrent network (GRN) architecture, according to one embodiment.

FIG. 8 illustrates a GRN model 800 architecture, according to one embodiment. The functioning of the GRN model 800 is described via a simplified working example 810. Consider the two sentences: "WAVES ARE CAUSED BY WIND" (premise 840); and "WINDS CAUSES MOST OCEAN WAVES" (hypothesis 850). As described above, first the all possible premise-hypothesis entity pairs are found at 811. This particular example provides 12 such pairs: 3 premise (WAVES, CAUSED, WIND) times 4 hypothesis (WINDS, CAUSES, OCEAN, WAVES) entities. To simplify for the sake of exposition, three entity pairs are focused on: (WAVES, OCEAN), (WIND, WINDS), and (WIND, OCEAN). As explained above, the shortest paths for each of these pairs are identified at the shortest pairs reference 812 (via the shortest path generator 725, FIG. 7). For example, for the pair (WAVES, OCEAN), the shortest path results are: WAVES→CAUSESDESIRE→SURF→ISA→WAVE→PARTOF→OCEAN, where WAVES, SURF, WAVES and OCEAN are entities along the path; and CAUSESDESIRE, ISA and PART OF are the relationships connecting them in sequential order.

In one embodiment, the GRN model 800 can take either relations, entities, or relations plus entities as its input. In FIG. 8, an instance is shown where relations are fed as input to the token representation layer 813. At the token representation layer 813, the tokens, which are relations in this example case, are transformed into vector representation using an embedding matrix. The transformed representations from the token representation layer 813 are then fed to a bidirectional Recurrent Neural network (RNN) in the sequence order captured by the shortest path at the path representation layer 814. The final hidden states from the bidirectional RNN at the path representation layer 814 are then concatenated at concatenation 815 processing to form a representation for the whole path at the pair representation layer 816. After passing through the path representation layer 816, the GRN model 800 has the vector representations for each of the entity pairs. These representations are then fed into a second bidirectional RNN in the order prescribed by the ordered set of entity pairs. In one embodiment, once the final hidden states of the pair-level encoder (GCN encoder 730, FIG. 7) are concatenated (at the concatenation 815 processing), a fully connected feed-forward neural network (FFNN) 830 with rectified linear units (ReLU) and linear activation with softmax layer 820 is used as a final prediction layer 818.

In one embodiment, for token-level encodings at the token representation layer 813, each pair $pair_i$ consists of a sequence of tokens $w_{it}$; $t \in [0; T]$ which are embedded using an embedding matrix $W_t$ as $x_{it} = W_t w_{it}$. Then, in one embodiment the bidirectional token-level RNN—a GRU—in this case—is used to form a fixed length representation by concatenating the final state from forward $\vec{h}_{it}=$ $\overrightarrow{GRU}(x_{i,t}), t \in [1, T])$ and backward $\overleftarrow{h}_{it} = \overleftarrow{GRU}(x_{i,t}), t \in [T, 1])$ passes in the GRU. This yields $h_i = [\vec{h}_{it}, \overleftarrow{h}_{t0}]$. Note that in one embodiment, KG embeddings (e.g., ComplEx (complex valued embeddings) and TransH (projects the entities into a hyperplane for addressing the issue of complex relation embedding), etc.) are used for token-level embeddings. These embeddings are trained on the KG (e.g., ConceptNet using OpenKE (an open-source framework for knowledge embedding)).

In one embodiment, the input to the pair-level encoder (e.g., GCN encoder 730, FIG. 7) is a sequence of token-level representations $h_1$; $h_2$; . . . ; $h_K$. Then, just as above, a bidirectional GRU computes the fixed length representation as: $\vec{Z} = \overrightarrow{GRU}(h_k), t \in [1, K]$; $\overleftarrow{Z} = \overleftarrow{GRU}(h_k), k \in [K, 1]$; and $Z = [\vec{Z}, \overleftarrow{Z}]$.

FIG. 9 illustrates a block diagram of a process 900 for interpretable knowledge contextualization by re-weighting KGs, according to one embodiment. In one embodiment, in block 910 process 900 utilizes a computing device (from computing node 10, FIG. 1, hardware and software layer 60, FIG. 2, processing system 300, FIG. 3, system 400, FIG. 4, system 500, FIG. 5, etc.) to extract (e.g., via the entity extractor 715, FIG. 7) information from a KG (e.g., a ConceptNet type KG, etc.). The information including entities extracted from nodes of the KG and relations extracted from edges of the KG. In block 920, process 900 further receives, by a shortest path generator (e.g., shortest path generator 725, FIG. 7), the extracted entities and relations, and potential assigned weights from a heuristic data repository (e.g., a storage system, a memory system, a storage device, a database, etc.). In block 930, process 900 further determines weights for the edges of the KG. In block 940, process 900 further assigns the weights to the edges of the KG.

In some embodiments, process 900 may include the feature that the heuristic data repository includes one or more heuristics selected from the group consisting of default cost heuristics, relevant relations heuristics, relation frequency heuristics, and normalized relation frequency heuristics.

In some embodiments, process 900 may include the feature that the KG comprises a natural language based KG. In one embodiment, for each labeled premise and hypothesis pair, entities are extracted from each respective sentence used for the KG. Process 900 may further include creating ordered entity pairs, ordered premise-hypothesis entity pairs, or non-ordered premise-hypothesis pairs.

In some embodiments, process 900 may include the feature that copies of the KG are created and default weights for the edges are replaced with customized weights based on the relevant relations heuristic, the relation frequency heuristic, and the normalized relation frequency heuristic.

In some embodiments, process 900 may include the feature that the relation frequency heuristic is based on a frequency of the relations as they occur in relation to an entity, and based on a normalized count of a number of outgoing edges bearing a same relation name from a given node.

In some embodiments, process 900 may additionally include the feature of the normalized relation frequency heuristic is based on a computation of an INF for every relation in the KG.

In some embodiments, process 900 may further include the feature that the shortest path generator finds all shortest paths between a first entity and a second entity of each premise-hypothesis entity pair, for every copy of the KG.

In some embodiments, process 900 may include the feature that the shortest paths are used: by accounting for a number of times relations appear in the shortest paths, and by a sequence order in which the shortest paths appear. Each of the shortest paths are represented by the entities along the respective shortest path, the relations along the respective shortest path, or by a combination thereof.

In some embodiments, process 900 may include classifying the relations using one or more encoders selected from a group consisting of a GCN encoder, a relation frequency encoder and a relation sequence encoder.

In some embodiments, the features described above contribute to the advantage of using the same knowledge in the form of a KG and producing different contexts depending on the task at hand to suppress noisy data and boost signal, and using heuristics from search and artificial intelligence (AI) models. Further advantages may include that information from an NLP problem instance is used to determine candidates for shortest path selection. Additional advantages may include that the output of shortest paths is fed into different types of graphical and non-graphical encoders to create a classifier (e.g., for classifying relations (edges). Further advantages may include that weight assignment is performed to improve contextualization output. By assigning different weights to the same edges with various weighting strategies, shortest path processing determines different paths between the same entity pairs.

One or more embodiments may be a system, a method, and/or a computer program product at any possible technical detail level of integration. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (RUM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated.

What is claimed is:

1. A method of assigning weights to a knowledge graph comprising:
   extracting information from a knowledge graph, the information comprising entities extracted from nodes of the knowledge graph and relations extracted from edges of the knowledge graph;
   receiving, by a shortest path generator, the extracted entities and relations, and potential weights, including default weights, from a heuristic data repository;
   assigning the default weights to the edges of the knowledge graph; and
   rewriting the default weights for the edges of the knowledge graph using a plurality of heuristics from the heuristic data repository.

2. The method of claim 1, wherein the plurality of heuristics from the heuristic data repository includes heuristics selected from the group consisting of default cost heuristics, relevant relations heuristics, relation frequency heuristics, and normalized relation frequency heuristics.

3. The method of claim 2, further comprising:
   creating ordered entity pairs or ordered premise-hypothesis entity pairs; wherein:
   the knowledge graph comprises a natural language based knowledge graph;
   for each labeled premise and hypothesis pair, entities are extracted from each respective sentence used for the knowledge graph;
   the default cost heuristics are a result of minimizing a number of hops between nodes of the knowledge graph.

4. The method of claim 3, wherein:
   copies of the knowledge graph are created and the default weights for the edges are rewritten with customized weights based on the relevant relations heuristic, the relation frequency heuristic, and the normalized relation frequency heuristic; and
   the relevant relations heuristics include a filtered subset of a total list of relations present in the knowledge graph.

5. The method of claim 4, wherein the relation frequency heuristic is based on a frequency of the relations as they occur in relation to an entity, and based on a normalized count of a number of outgoing edges bearing a same relation name from a given node.

6. The method of claim 4, wherein the normalized relation frequency heuristic is based on a computation of an Inverse Node Frequency (INF) for every relation in the knowledge graph.

7. The method of claim 4, wherein the shortest path generator finds all shortest paths between a first entity and a second entity of each premise-hypothesis entity pair, for every copy of the knowledge graph.

8. The method of claim 7, wherein:
   the shortest paths are used: by accounting for a number of times relations appear in the shortest paths, and by a sequence order in which the shortest paths appear; and
   each of the shortest paths are represented by the entities along the respective shortest path, the relations along the respective shortest path, or by a combination thereof.

9. The method of claim 8, further comprising:
   classifying the relations using one or more encoders selected from a group consisting of a graph convolution network (GCN) encoder, a relation frequency encoder, and a relation sequence encoder.

10. A computer program product assigning weights to a knowledge graph, the computer program product comprising a computer readable storage medium having program instructions embodied therewith, the program instructions executable by a processor to cause the processor to:
    extract, by the processor, information from a knowledge graph, the information comprising entities extracted from nodes of the knowledge graph and relations extracted from edges of the knowledge graph;
    receive, by the processor, the extracted entities and relations, and potential weights, including default weights, from a heuristic data repository;
    assign, by the processor, the default weights to the edges of the knowledge graph; and
    rewrite, by the processor, the default weights for the edges of the knowledge graph using a plurality of heuristics from the heuristic data repository.

11. The computer program product of claim 10, wherein the plurality of heuristics from the heuristic data repository includes heuristics selected from the group consisting of default cost heuristics, relevant relations heuristics, relation frequency heuristics, and normalized relation frequency heuristics.

12. The computer program product of claim 11, wherein:
    the program instructions executable by the processor further cause the processor to:
    create, by the processor, ordered entity pairs or ordered premise-hypothesis entity pairs;
    the knowledge graph comprises a natural language based knowledge graph;
    for each labeled premise and hypothesis pair, entities are extracted from each respective sentence used for the knowledge graph; and
    the default cost heuristics are a result of minimizing a number of hops between nodes of the knowledge graph.

13. The computer program product of claim 12, wherein:
    copies of the knowledge graph are created and the default weights for the edges are rewritten with customized weights based on the relevant relations heuristic, the relation frequency heuristic, and the normalized relation frequency heuristic; and
    the relevant relations heuristics include a filtered subset of a total list of relations present in the knowledge graph.

14. The computer program product of claim 13, wherein:
    the relation frequency heuristic is based on a frequency of the relations as they occur in relation to an entity, and based on a normalized count of a number of outgoing edges bearing a same relation name from a given node;
    the normalized relation frequency heuristic is based on a computation of an Inverse Node Frequency (INF) for every relation in the knowledge graph; and
    the processor finds all shortest paths between a first entity and a second entity of each premise-hypothesis entity pair, for every copy of the knowledge graph.

15. The computer program product of claim 14, wherein:
    the shortest paths are used: by accounting for a number of times relations appear in the shortest paths, and by a sequence order in which the shortest paths appear; and
    each of the shortest paths are represented by the entities along the respective shortest path, the relations along the respective shortest path, or by a combination thereof.

16. The computer program product of claim 13, wherein the program instructions executable by the processor further cause the processor to:
    classify, by the processor, the relations using one or more encoders selected from a group consisting of a graph convolution network (GCN) encoder, a relation frequency encoder, and a relation sequence encoder.

17. An apparatus comprising:
a memory configured to store instructions; and
a processor configured to execute the instructions to:
  extract information from a knowledge graph, the information comprising entities extracted from nodes of the knowledge graph and relations extracted from edges of the knowledge graph;
  receive the extracted entities and relations, and potential weights, including default weights, from a heuristic data repository;
  assign the default weights to the edges of the knowledge graph; and
  rewrite the default weights for the edges of the knowledge graph using a plurality of heuristics from the heuristic data repository.

18. The apparatus of claim 17, wherein:
the processor is further configured to execute the instructions to:
  create ordered entity pairs or ordered premise-hypothesis entity pairs;
the plurality of heuristics from the heuristic data repository includes heuristics selected from the group consisting of default cost heuristics, relevant relations heuristics, relation frequency heuristics, and normalized relation frequency heuristics;
the knowledge graph comprises a natural language based knowledge graph;
for each labeled premise and hypothesis pair, entities are extracted from each respective sentence used for the knowledge graph; and
the default cost heuristics are a result of minimizing a number of hops between nodes of the knowledge graph.

19. The apparatus of claim 18, wherein:
copies of the knowledge graph are created and default weights for the edges are replaced with customized weights based on the relevant relations heuristic, the relation frequency heuristic, and the normalized relation frequency heuristic;
the relevant relations heuristics include a filtered subset of a total list of relations present in the knowledge graph;
the relation frequency heuristic is based on a frequency of the relations as they occur in relation to an entity, and based on a normalized count of a number of outgoing edges bearing a same relation name from a given node;
the normalized relation frequency heuristic is based on a computation of an Inverse Node Frequency (INF) for every relation in the knowledge graph; and
the processor finds all shortest paths between a first entity and a second entity of each premise-hypothesis entity pair, for every copy of the knowledge graph.

20. The apparatus of claim 17, wherein:
the processor is further configured to execute the instructions to:
  classify the relations using one or more encoders selected from a group consisting of a graph convolution network (GCN) encoder, a relation frequency encoder, and a relation sequence encoder;
the shortest paths are used: by accounting for a number of times relations appear in the shortest paths, and by a sequence order in which the shortest paths appear; and
each of the shortest paths are represented by the entities along the respective shortest path, the relations along the respective shortest path, or by a combination thereof.

* * * * *